US009323085B2

(12) United States Patent
Uchimi

(10) Patent No.: US 9,323,085 B2
(45) Date of Patent: Apr. 26, 2016

(54) IMAGE DISPLAY APPARATUS

(71) Applicant: CANON KABUSHIKI KAISHA, Tokyo (JP)

(72) Inventor: Tasuku Uchimi, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 14/275,367

(22) Filed: May 12, 2014

(65) Prior Publication Data

US 2014/0340613 A1    Nov. 20, 2014

(30) Foreign Application Priority Data

May 14, 2013   (JP) ................... 2013-102222

(51) Int. Cl.
*G02F 1/1333* (2006.01)
(52) U.S. Cl.
CPC .... *G02F 1/133308* (2013.01); *G02F 2201/503* (2013.01)
(58) Field of Classification Search
CPC .............. G02F 1/133308; G02F 2201/503
USPC ....................................... 349/58, 60
See application file for complete search history.

(56) References Cited

U.S. PATENT DOCUMENTS

| 6,734,928 B2 * | 5/2004 | Ito ............ G02F 1/133308 349/58 |
| 8,174,511 B2 * | 5/2012 | Takenaka ........... G06F 3/016 345/104 |
| 2005/0286002 A1 * | 12/2005 | Tajima ............ G02F 1/133308 349/139 |
| 2013/0258239 A1 * | 10/2013 | Fukayama ................... 349/60 |

FOREIGN PATENT DOCUMENTS

JP    2010-204357 A    9/2010
JP    2012-047913 A    3/2012

* cited by examiner

*Primary Examiner* — Nathanael R Briggs
(74) *Attorney, Agent, or Firm* — Cowan, Liebowitz & Latman, P.C.

(57) ABSTRACT

An image display apparatus including a display panel, a holding member holding four sides of the display panel, and cushioning members disposed between the display panel and the holding member such that a pressing force depending on an amount of deformation is applied to the display panel, wherein a pressing force acting on the display panel through the cushioning member for a lower side among the four sides of the display panel is higher than a pressing force acting on the display panel through the cushioning members for other sides of the display panel.

16 Claims, 15 Drawing Sheets

IMAGE DISPLAY APPARATUS

BACKGROUND OF THE INVENTION

1. Field of the Invention

The present invention relates to an image display apparatus, and in particular, to an image display apparatus having a structure in which a frame supports a display panel in the same ways as the frame supports a liquid crystal panel.

2. Description of the Related Art

A display panel such as a liquid crystal panel ox an organic electroluminescent (EL) panel includes display elements such as liquid crystal elements or organic light emitting elements provided between two glass substrates on each of which a thin film device is formed.

An image display apparatus with a display panel is structured such that a metal case in or to which the display panel is housed or bonded is disposed opposite a display surface of the display panel and that the display surface side is covered with a metal frame. An image display apparatus with a liquid crystal panel as a display panel includes the liquid crystal panel, a backlight unit that illuminates the liquid crystal panel, and optical sheets that condense light from the backlight unit. The optical sheets and the backlight unit are arranged on a rear surface of the liquid crystal panel in this order.

In order to maintain a given space between the liquid crystal panel and the optical sheets and to hold the liquid crystal panel itself, a panel holder formed of resin is disposed so as to cover the periphery of a display area of the liquid crystal panel from a rear surface of the liquid crystal panel. Furthermore, a metal frame is disposed on a front surface (display surface side) of the liquid crystal panel. An elastic body such as a cushion is disposed between the liquid crystal panel and the panel holder and between the liquid crystal panel and the frame. Such a structure allows the liquid crystal panel to be sandwiched and held between the panel holder and the frame.

A method for manufacturing a display panel will be described. Glass substrates providing the display panel are obtained by cutting a large mother glass substrate. The mother glass substrate is cut by scribing or breaking using a diamond cutter. Thus, burrs are formed on end surfaces of the glass substrates. Burrs may be present in glass substrates providing a display panel such as a liquid crystal panel or an organic EL panel.

SUMMARY OF THE INVENTION

When the image display apparatus is upright, a lower end of the display panel is in contact with the panel holder. At this time, the lower end of the display panel may be caught on the panel holder as a result of the weight of the display panel and the effect of burrs. When the lower end is caught while the display panel is at a position offset from the original position of the display panel as a result of external force, vibration, or the like, the display panel may fail to return to the original position. In this case, the display panel may be deformed. In particular, if the display panel is deformed when the end of the panel is caught on the panel holder, the display panel is stressed and the stress is prevented from being relieved unless the display panel is disengaged from the panel holder. The deformation and stress of the display panel may cause display unevenness. When the display panel is stressed, the stressed area is locally subjected to display unevenness.

If static pressure or impact is applied directly in the display area of the display panel, the entire screen of the display panel is often locally stressed. In particular, when the display panel is a liquid crystal panel, the liquid crystal is locally disoriented. Thus, when the entire screen displays black, incident light is locally transmitted only through the stressed position and blocked at the other positions. As a result, the display panel partly has a high brightness and provides uneven black display.

Japanese Patent Application Laid-open No. 2010-204357 proposes a configuration in which a lower end side of a liquid crystal panel and a panel holder contact each other at an inclined surface so that, when a liquid crystal display apparatus is shifted from a flatly placed state to an installed state, the liquid crystal panel moves forward by sliding down along the inclined surface against friction under the weight of the liquid crystal panel. This configuration is intended to temporarily reduce the stress applied to the display panel.

FIG. 11 is a diagram showing display unevenness in an image display apparatus. An image display apparatus 1 has a display panel 20 and a metal frame 10 that covers the periphery of a display area of a display panel 20. FIG. 11 shows that the entire screen of the display panel 20 displays black, and display unevenness is denoted by reference character M at a lower end of the display panel 20. The display unevenness M is an area locally having a high brightness when the entire screen of the display panel 20 displays black. The locally high brightness causes this area to appear as white blur, thus reducing display quality.

FIG. 12 is a cross-sectional view taken along line F-F in FIG. 11. The display panel 20 includes a first glass substrate 20a on a front surface side and a second glass substrate 20b on a rear surface side. The display panel 20 is held by sandwiching both the first glass substrate 20a and the second glass substrate 20b between a first cushion 11 and a second cushion 12. Furthermore, the weight of the display panel 20 is supported from below by a panel holder 30 formed of resin. It is assumed that, when vibration or static pressure is applied to the image display apparatus 3, the display panel 20 moves in the direction of arrow D to a position shown by a dashed line L in FIG. 12. It is further assumed that a burr 20c protrudes from a lower portion of the display panel 20. Then, the display panel 20 having moved to the position L is caught on the panel holder 30 due to the burr 20c and fails to return to the original position. At this time, a load F1 is imposed on the display panel 20 through the first cushion 11. Thus, the display panel 20 is locally stressed, and display unevenness occurs in the stressed area.

The liquid crystal panel will be described. The liquid crystal panel has a normally white configuration in which, while no voltage is applied to the liquid crystal panel, the transmittance of incident light is maximized to provide white display. Alternatively, the liquid crystal panel has a normally black configuration in which, while no voltage is applied to the liquid crystal panel, the transmittance of incident light is minimized to provide black display. While no voltage is applied to the liquid crystal panel, control of orientation of a liquid crystal based on voltage application is not performed, and the entire screen is displayed at the same gradation. As a result, display unevenness is likely to be viewed.

The present invention provides a technique that reduces local stress occurring in the display panel of the image display apparatus to suppress possible display unevenness.

The present invention is an image display apparatus including:

a display panel;

a holding member holding four sides of the display panel; and cushioning members disposed between the display panel and the holding member such that a pressing force depending on an amount of deformation is applied to the display panel, wherein a pressing force acting on the display panel through the cushioning member for a lower side among the four sides of the display panel is higher than a pressing force acting on the display panel through the cushioning members for other sides of the display panel.

The present invention enables a reduction in local stress occurring in the display panel of the image display apparatus to suppress possible display unevenness.

Further features of the present invention will become apparent from the following description of exemplary embodiments (with reference to the attached drawings).

DESCRIPTION OF THE EMBODIMENTS

Embodiment 1

A first embodiment of the present invention will be described below.

Figure 1:
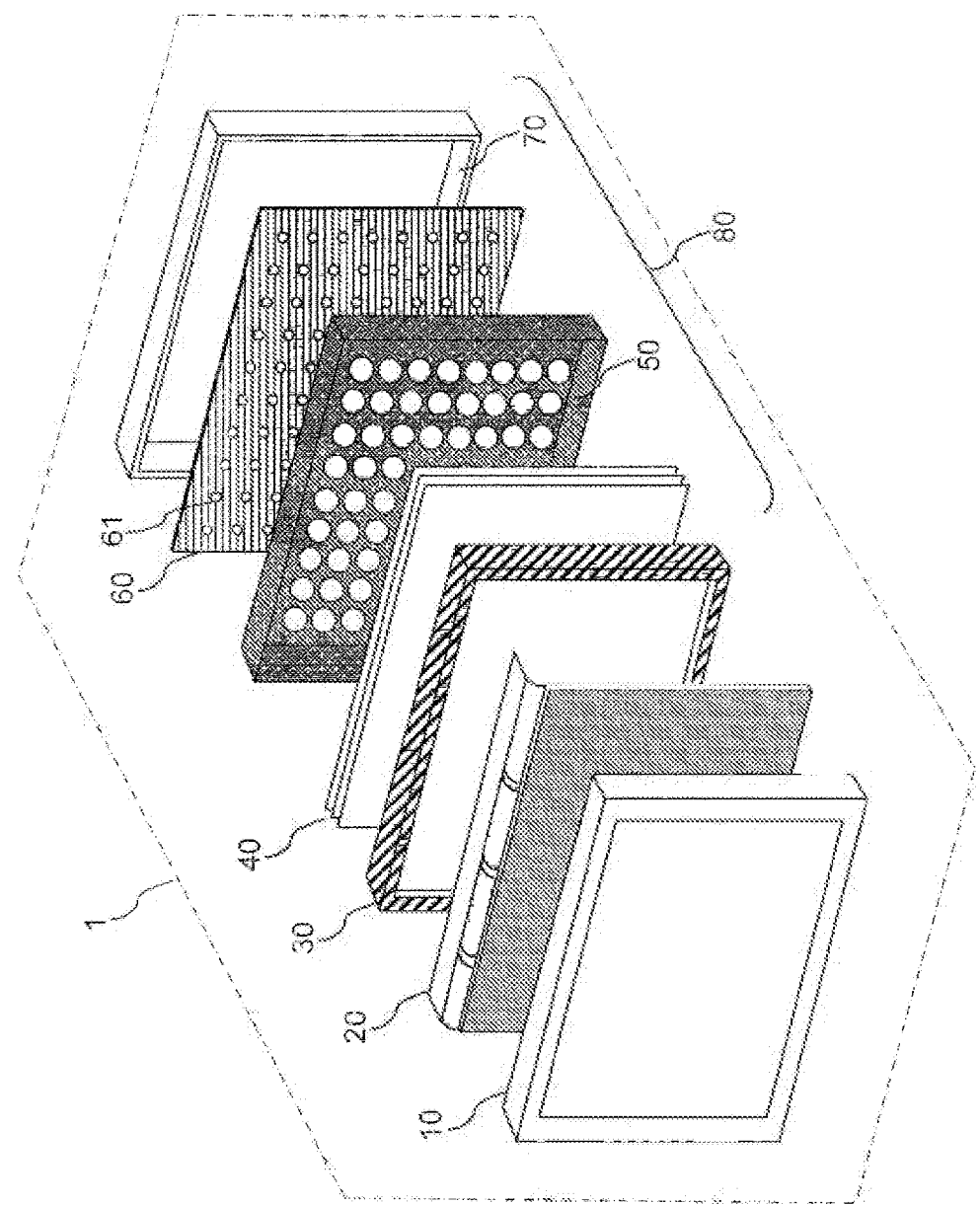
FIG. 1 is an exploded perspective view of an image display apparatus according to a first embodiment.

FIG. 1 is an exploded perspective view of an image display apparatus according to the first embodiment. In the first embodiment, the use of a liquid crystal panel as a display panel will be described by way of example.

An image display apparatus 1 includes a frame 10, a display panel 20, a panel holder 30, an optical sheet 40, a reflective sheet 50, a substrate 60, and a case 70. The frame 10 is often made of metal and formed by pressing or machining. However, the frame 10 may be formed by molding a resin. The panel holder 30 is preferably formed by molding a resin but may be formed using a metal material. The panel holder 30 holds and houses the display panel 20 so that a given space is maintained between the panel holder 30 and the optical sheet 40.

The optical sheet 40 diffuses light from a backlight unit 80. The reflective sheet 50 reflects light from a light source. The light source 61 such as a light emitting diode (LED) or a cold cathode fluorescent lamp (CCFL) is mounted on the substrate 60. Furthermore, backlight schemes include a direct lighting scheme and an edge light scheme, and the present invention is applicable to both schemes. The case 70 houses the optical sheet 40, the reflective sheet 50, and the substrate 60. The panel holder 30, the optical sheet 40, the reflective sheet 50, the substrate 60, and the case 70 provide the backlight unit 80, which illuminates the display panel 20.

Figure 2:
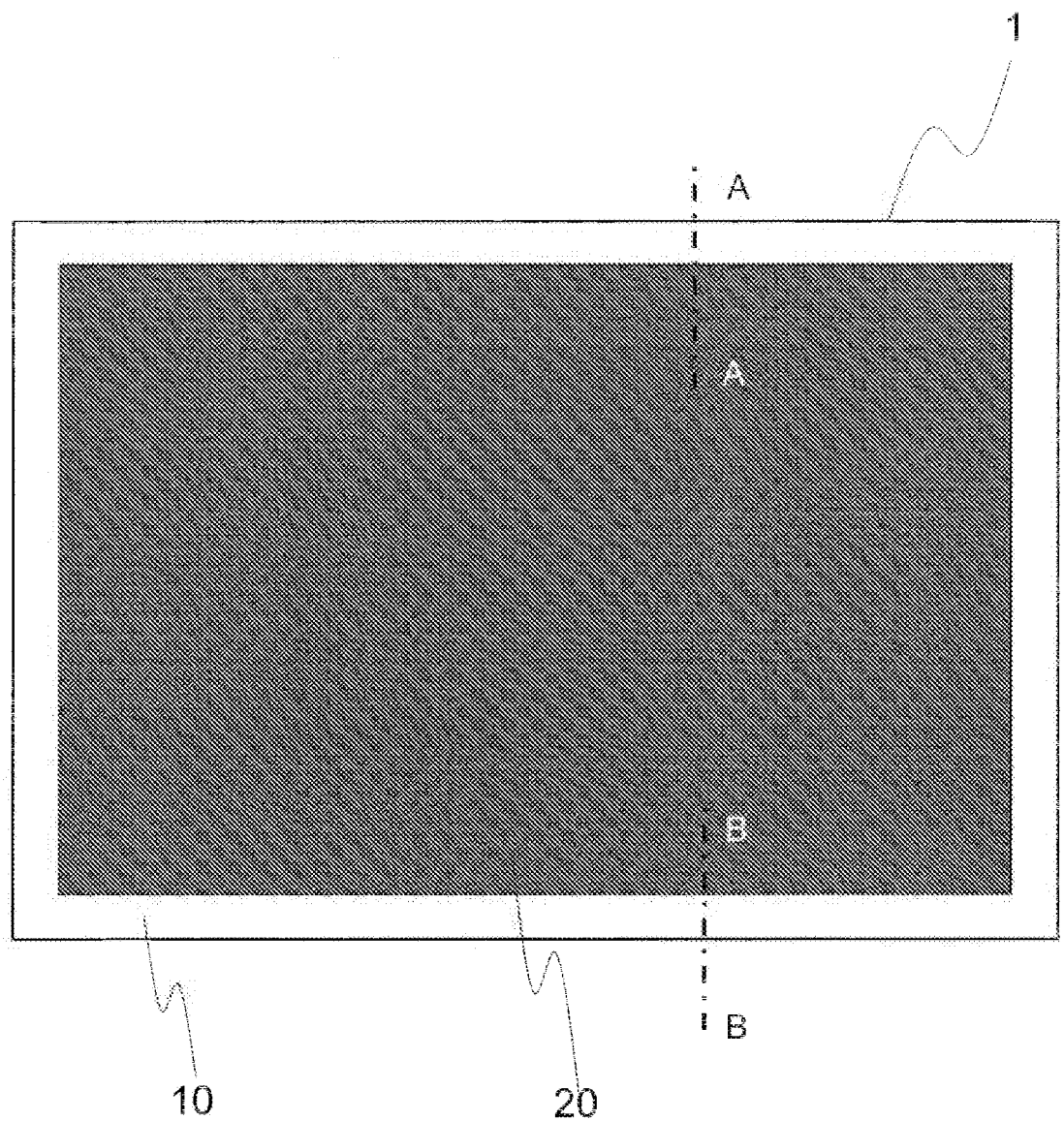
FIG. 2 is a front view schematically showing the image display apparatus according to the first embodiment.
Figure 3A:
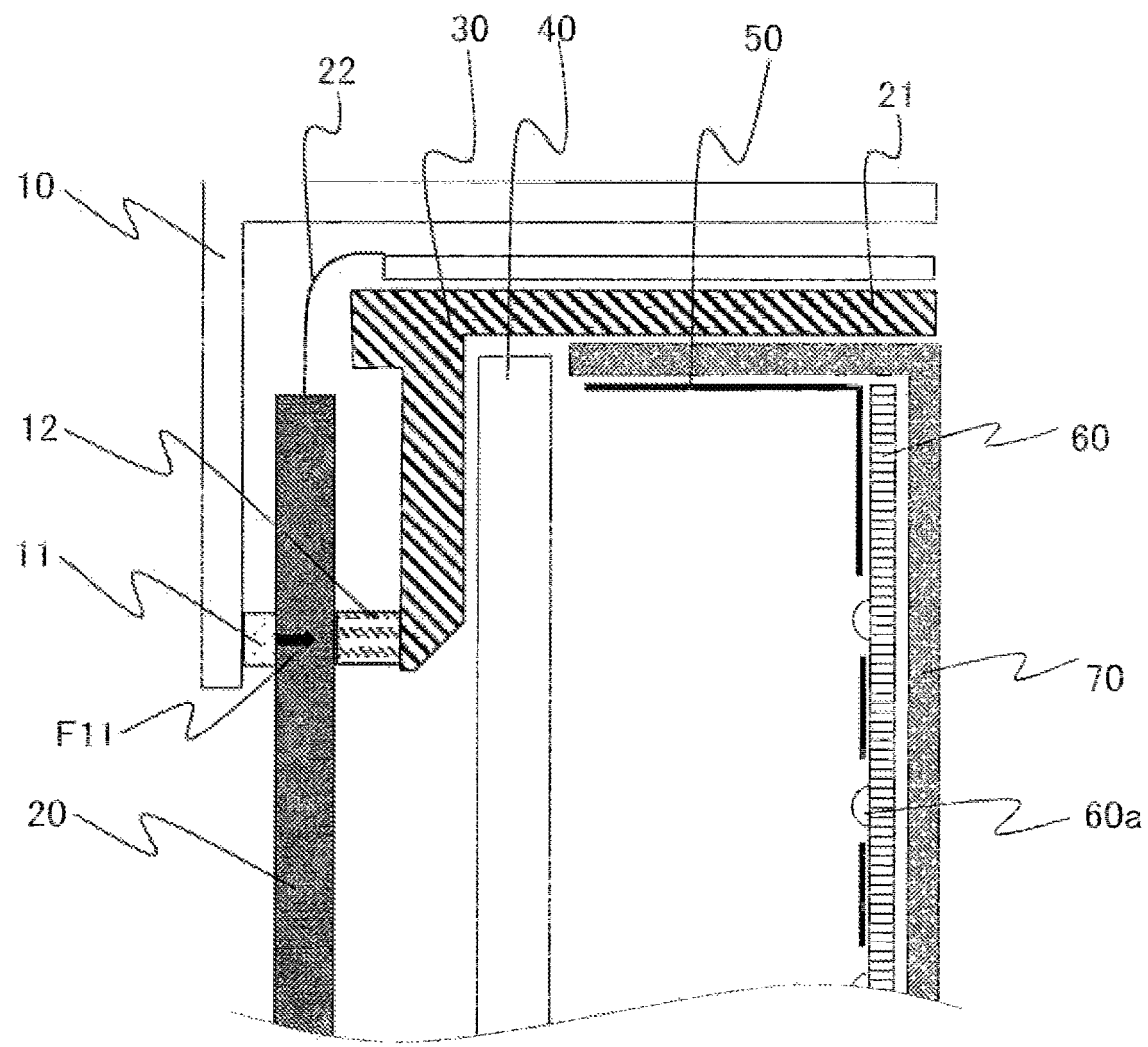
FIG. 3A is a cross-sectional view taken along line A-A in FIG. 2.
Figure 3B:
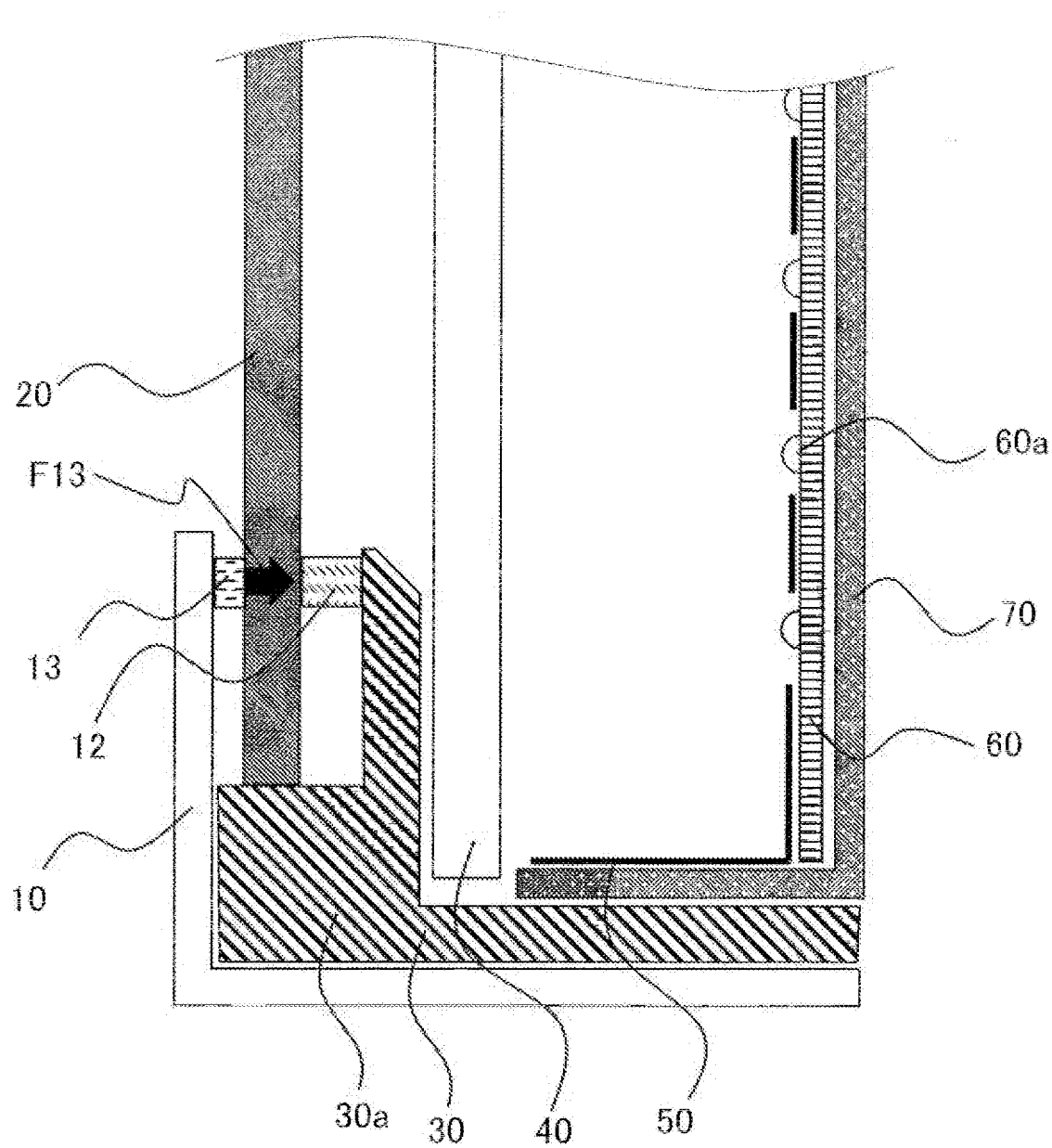
FIG. 3B is a cross-sectional view taken along line B-B in FIG. 2.
Figure 4:
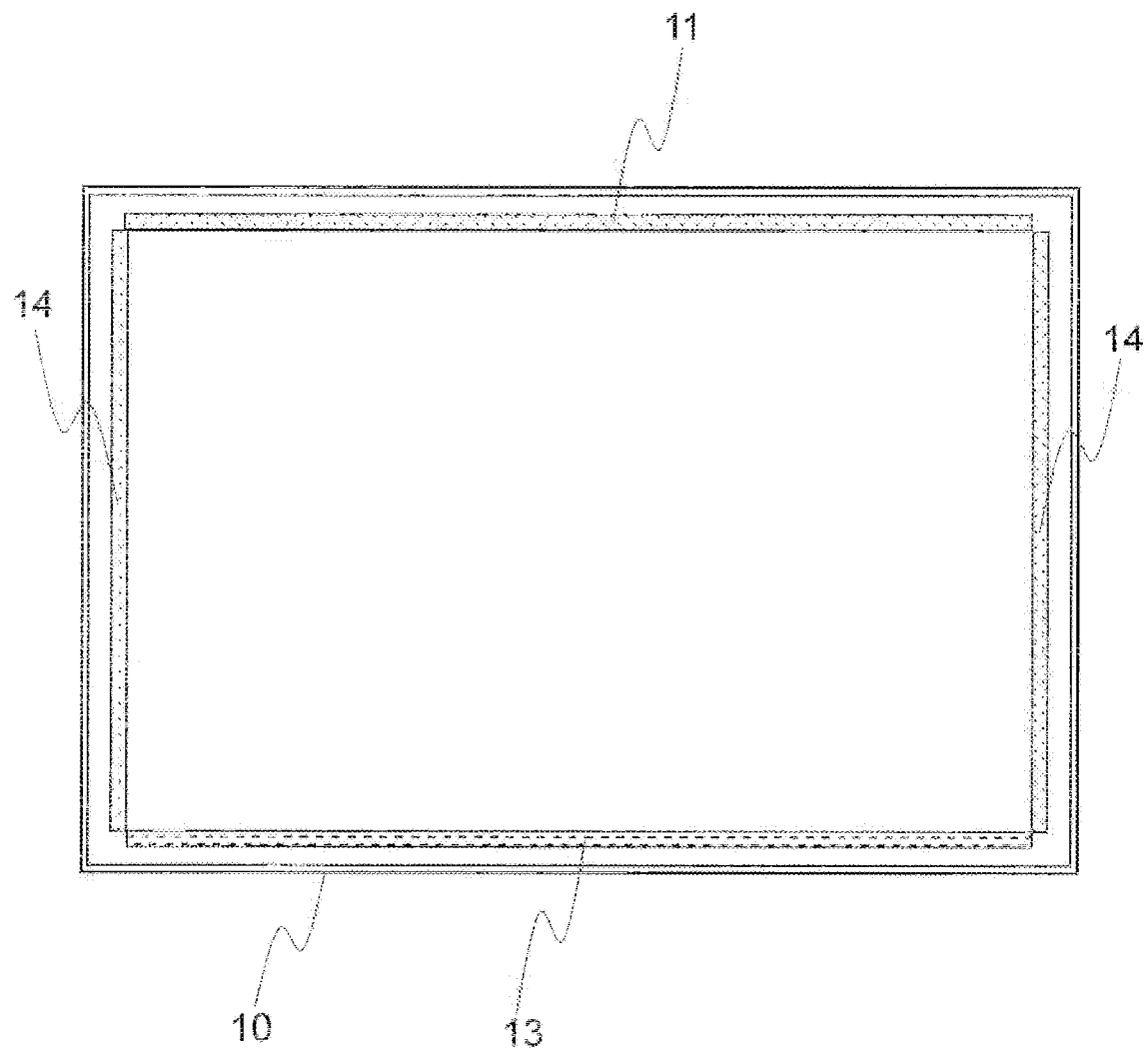
FIG. 4 is a diagram schematically showing arrangement of front surface elastic bodies with respect to a rear surface side of a frame according to the first embodiment.
Figure 5A:
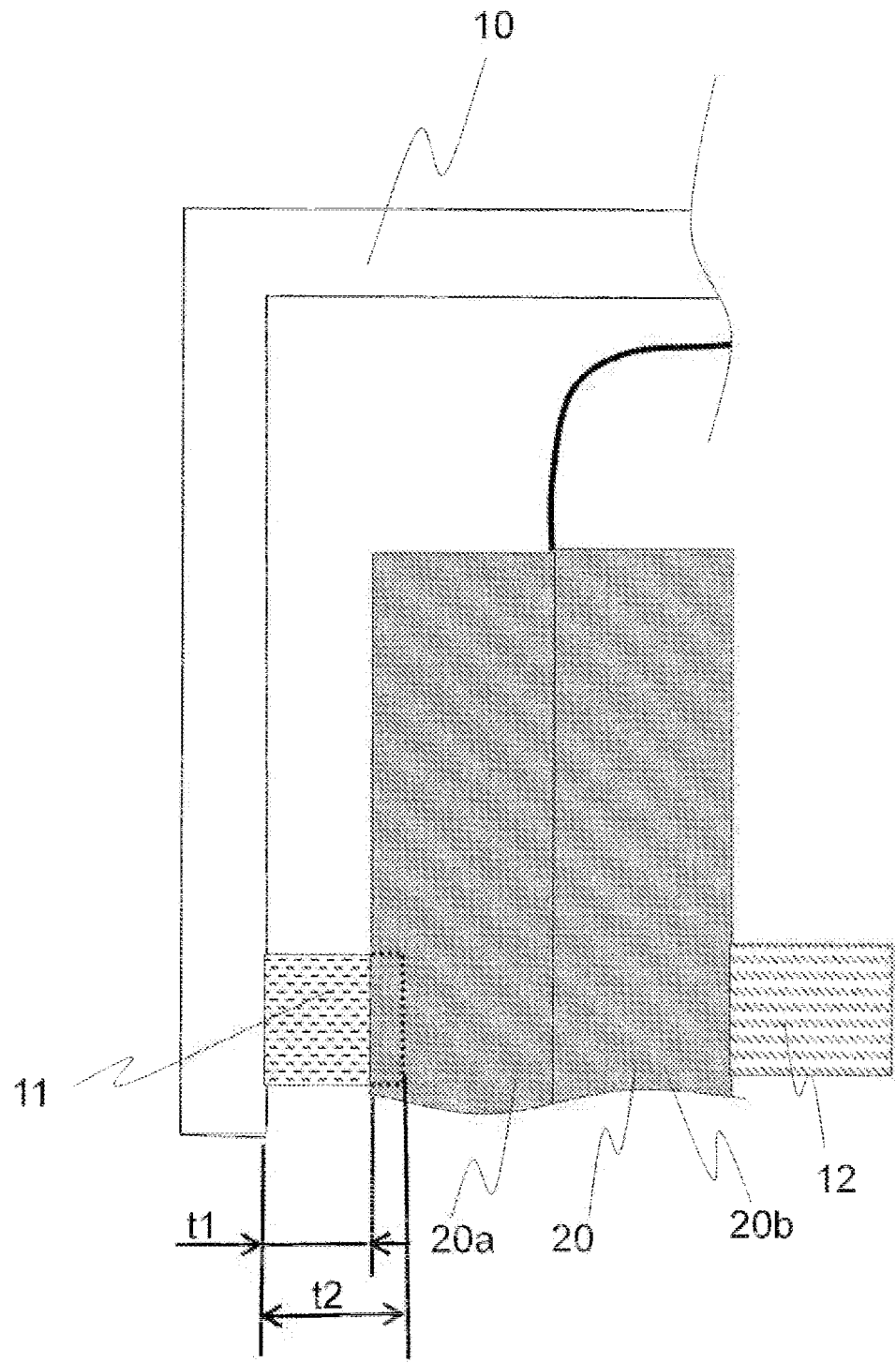
FIG. 5A is an enlarged cross-sectional view taken along line A-A in FIG. 2.
Figure 5B:
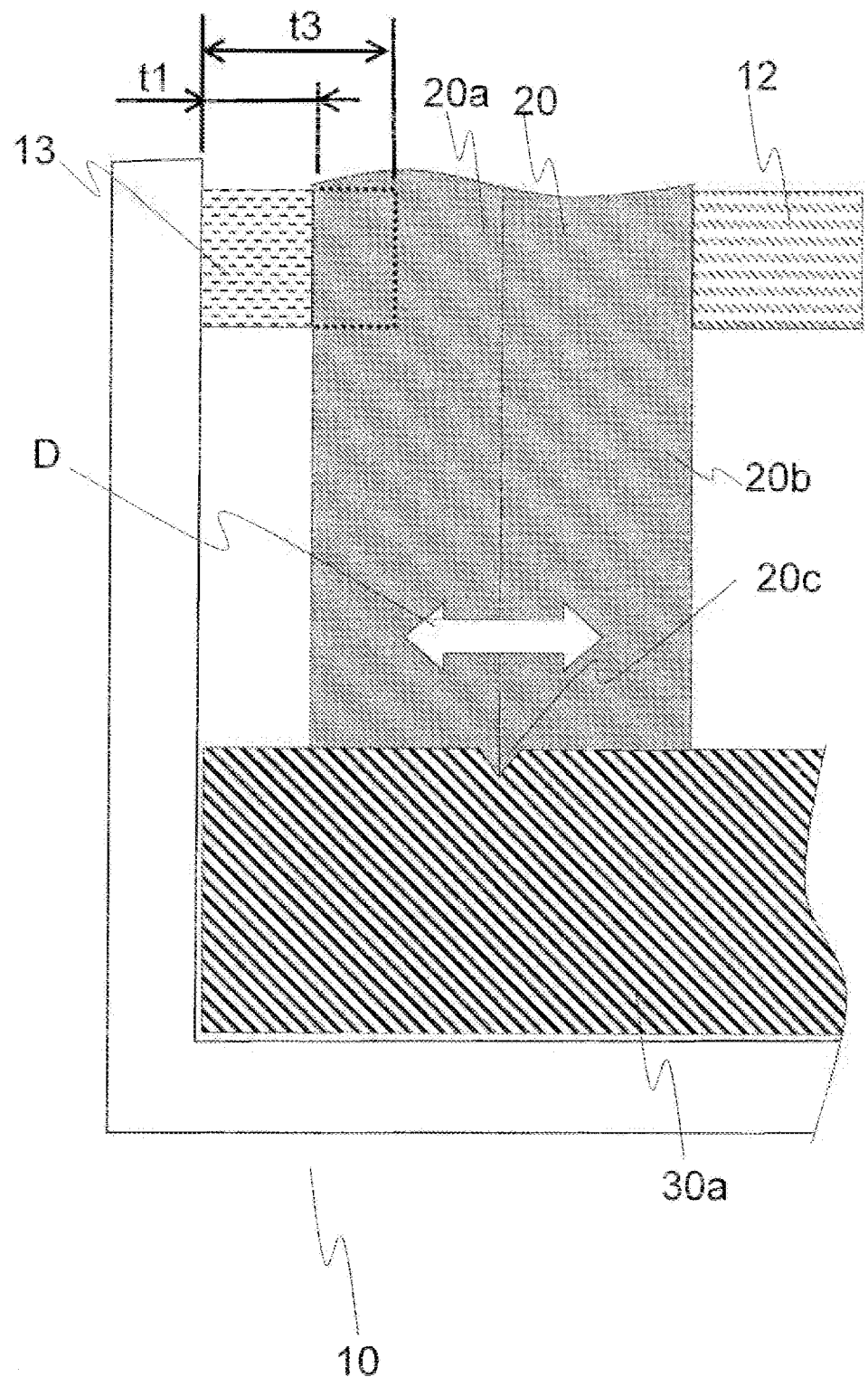
FIG. 5B is an enlarged cross-sectional view taken along line B-B in FIG. 2.

FIG. 2 is a front view schematically showing the image display apparatus according to the first embodiment. FIG. 3A is a cross-sectional view of the image display apparatus according to the first embodiment taken along line A-A in FIG. 2. FIG. 3B is a cross-sectional view of the image display apparatus according to the first embodiment taken along line B-B in FIG. 2. FIG. 4 is a diagram schematically showing arrangement of front surface elastic bodies with respect to a rear surface side of the frame according to the first embodiment. FIG. 5A is an enlarged cross-sectional view of the image display apparatus according to the first embodiment taken along line A-A in FIG. 2. FIG. 5B is an enlarged cross-sectional view of the image display apparatus according to the first embodiment taken along line B-B in FIG. 2.

As shown in FIG. 2, the frame 10 is disposed so as to cover a peripheral portion (four outer peripheral sides) of a display area on a front surface (display surface) side of the display panel 20. As shown in FIG. 3A and FIG. 3B, front surface elastic bodies 11 and 13 are disposed on four rear sides of the frame 10 to hold the display panel 20 when the display panel 20 is assembled into the image display apparatus 1. Furthermore, a rear surface elastic body 12 is disposed on the rear surface side of the display panel 20. The rear surface elastic body 12 and the front surface elastic bodies 11 and 13 are desirably formed of a flexible material so as not to cause a scratch, a dent, or the like on the display panel 20. The front surface elastic bodies are cushioning members disposed between the display panel and the frame, serving as a holding member holding the four sides of the display panel from a front surface thereof, the cushioning members allowing a pressing force depending on the amount of deformation to act on the display panel. The rear surface elastic body is a cushioning member disposed between the display panel and the panel holder, serving as a holding member holding the four sides of the display panel from the rear surface thereof, the cushioning member allowing a pressing force depending on the amount of deformation to act on the display panel. FIG. 3A shows a cross section of an upper portion of the display panel 20. FIG. 3B shows a cross section of a lower portion of the display panel 20. Pressing forces applied to the display panel 20 through the front surface elastic bodies 11 and 13 when the display panel 20 is assembled into the image display apparatus 1 are denoted by F11 and F13, respectively. The sizes of arrows indicate the magnitudes of the pressing forces F11 and F13 applied to the display panel 20. That is, the magnitude relation between the pressing forces F11 and F13 applied to the display panel 20 is set as follows.

$$F11 < F13$$

The front surface elastic bodies, disposed on the rear surface of the frame 10, will be described. As shown in FIG. 4, the front surface elastic bodies 11 and 13 are stuck to the frame 10 in a longitudinal direction (horizontal direction)

thereof. On the other hand, a front surface elastic body 14 is stuck to the frame 10 in a short side direction (vertical direction) thereof. The front surface elastic bodies 11 and 14 are set to allow the pressing force F11 to be applied. The front surface elastic body 13 is set to allow the pressing force F13 to be applied.

In other words, the pressing force acting on the display panel 20 through the front surface elastic body for one of four sides of the display panel 20 which corresponds to a lower side is set higher than the pressing force acting on the display panel 20 through the front surface elastic bodies for the three other sides of the display panel. The weight of the display panel 20 is supported by a support section 30*a* of the panel holder 30. If the pressing force acting on the display panel 20 through the front surface elastic body for the lower side of the display panel is low as in the case of the conventional technique, the display panel 20 is likely to move forward and backward at the support section, which is in contact with the lower side of the display panel 20 to support the weight of the display panel 20, when vibration or external force is applied to the display panel 20. Then, as described above, more display unevenness may occur or the display unevenness may vary, depending on the position of the display panel 20. On the other hand, according to the first embodiment, a higher pressing force acts on the lower side of the display panel 20 through the corresponding front surface elastic body 13. This enables front-back movement of the lower side of the display panel 20 to be suppressed, allowing possible display unevenness to be inhibited.

If the display panel 20 is subjected to deformation such as warpage as a result of a change in a usage environment condition such as temperature or humidity, the compression rate of the front surface elastic body and thus the pressing force increase in the four corners of the display panel 20. The pressing force acting on the front surface elastic bodies for the three sides, that is, all the sides other then the lower side, is set to be low enough to prevent the display panel 20 from being subjected to display unevenness. The pressing force on the front surface elastic body for the lower side is set to be high enough to exert a given holding force on the display panel 20.

The pressing force acting on the display panel 20 through the front surface elastic body will be described using the compression ratio of the front surface elastic body. The thickness of the front surface elastic bodies 11 and 13 changes from an initial thickness before assembly of the display panel 20 into the image display apparatus 1 to a thickness after compression resulting from the assembly of the display panel 20. In this case, the compression ratio of the front surface elastic body is calculated as follows.

$$\text{compression ratio (\%)} = \frac{\text{the amount of compression of the front surface elastic body (mm)}}{\text{the thickness of the front surface elastic body (mm)}} \times 100 \quad \text{[Formula 1]}$$

In this formula, the amount of compression of the front surface elastic body on the numerator refers to a difference between the initial thickness and the compressed thickness. The thickness of the front surface elastic body on the denominator is the initial thickness.

FIG. 5A is an enlarged cross-sectional view of the image display apparatus according to the first embodiment taken along line A-A in FIG. 2. FIG. 5B is an enlarged cross-sectional view of the image display apparatus according to the first embodiment taken along line B-B in FIG. 2. In FIG. 5A, the compressed thickness is denoted by reference numeral t1, and the initial thickness is denoted by reference numeral t2. In FIG. 5B, the compressed thickness is denoted by reference numeral t1, and the initial thickness is denoted by reference numeral t3. Applying these terms to Formula 1 allows the compression ratio C11 of the front surface elastic body 11 to be calculated as follows.

$$C11=(t2-t1)/t2\times100$$

Furthermore, the compression ratio C13 of the front surface elastic body 13 is calculated as follows.

$$C13=(t3-t1)/t3\times100$$

The relation between the thicknesses of the front surface elastic bodies 11 and 13 before assembly is t3>t2. The front surface elastic body 13 is thicker, and thus, the relation between the compression ratios of the front surface elastic bodies 11 and 13 is C13>C11. Consequently, the pressing force acting through the front surface elastic body 13 is higher than the pressing force acting through the front surface elastic body 11.

Figure 6:
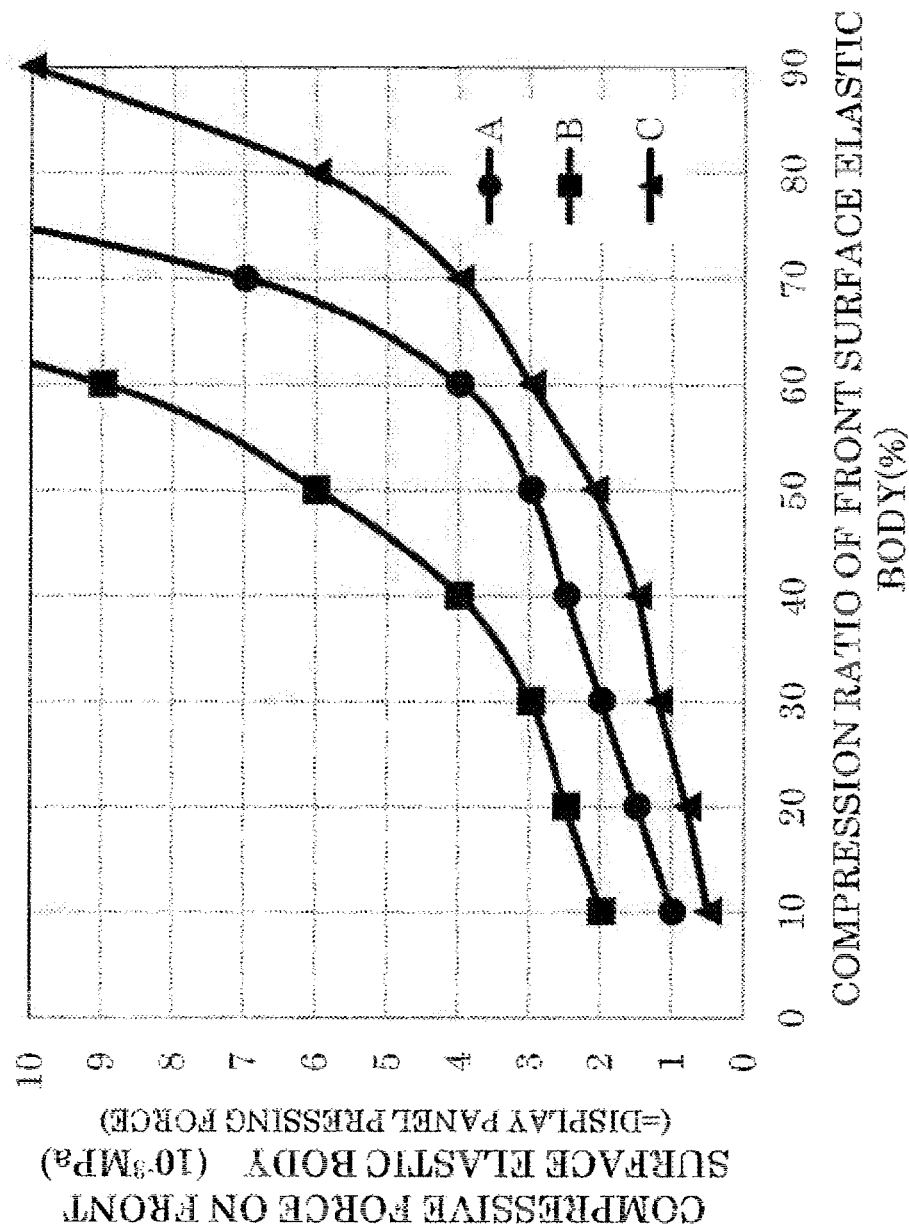
FIG. 6 is a graph showing the relation between the compression ratio of the front surface elastic body and both a compressive force and a pressing force applied to a display panel.

Now, the relation between the compression ratio of the front surface elastic body and both a compressive force and the display panel pressing force will be described. FIG. 6 is a graph showing an example of the relation between the compression ratio of the front surface elastic body and both the compressive force on the front surface elastic body and the pressing force on the display panel in the image display apparatus according to the present embodiment. Graphs A, B, and C relate to front surface elastic bodies as elastic members having different physical properties (elastic property and elastic modulus). The magnitude of the compressive force corresponding to the same compression ratio varies depending on material properties. However, a common tendency is that an increase in the compression ratio of the front surface elastic body is followed by an increase in the compressive force on the front surface elastic body. Another tendency is that An increase in the compression ratio is followed by a rapid increase in the compressive force. Thus, selection of the appropriate compression ratio and material is important. Since the front surface elastic body is in contact with the display panel, the compressive force on the front surface elastic body is expected to be equivalent to the pressing force on the display panel. The pressing force is generated all along the periphery of the display panel. However, the compression ratio is not constant at all holding positions due to deformation of the display panel such as warpage, and thus, the pressing force is not constant all along the periphery of the display panel. Furthermore, an excessive pressing force causes the display panel to be subjected to stress that may affect display, for example, lead to display unevenness.

For example, it is assumed that a material A is selected ds the material of the front surface elastic body, and the stress causing display unevenness is assumed to be $3\times10^{-3}$ MPa or more. Then, in such cross sections as shown in FIG. 5, the compression ratio of the front surface elastic body needs to be set to 50% or less. For example, when the front surface elastic bodies 11 and 13 are assumed to be formed of the material A, then the compression ratio C11 of the front surface elastic body 11 is assumed to be 20%, and the compression ratio C13 of the front surface elastic body 13 is assumed to be 40%. In this case, the compression ratio on an upper side, a right side, and a left side of the display panel is 20% and is low enough compared to a compression ratio of 50% at which display unevenness may occur. The compression ratio on the lower side is set to 40% and is higher than the compression ratio on the other sides. However, the compression ratio on the lower side is set with a margin of 10% taken into account in preparation for an increase in compression ratio which may occur if the display panel 20 is subjected to deformation such as warpage. Thus, the shape and physical properties of the front surface elastic body are determined so that the compression ratio is inhibited from increasing above 50%, at which display unevenness may occur, even when the usage environment condition such as temperature or humidity changes to cause the display panel 20 to be warped, increasing the compression ratio of the front surface elastic body.

As described above, front-back movement of the lower end of the display panel can be suppressed by setting the compression ratio of the front surface elastic body disposed on the lower side of the display panel to be higher than the compression ratios of the front surface elastic bodies disposed on the other sides. This restrains the display panel from moving to cause stress. Furthermore, even if the glass substrate in the display panel has a bur, the burr is restrained from being caught at such a position where the display panel may be stressed because the movement itself of the display panel is suppressed. This inhibits possible display unevenness in the display panel.

Embodiment 2

Figure 7:
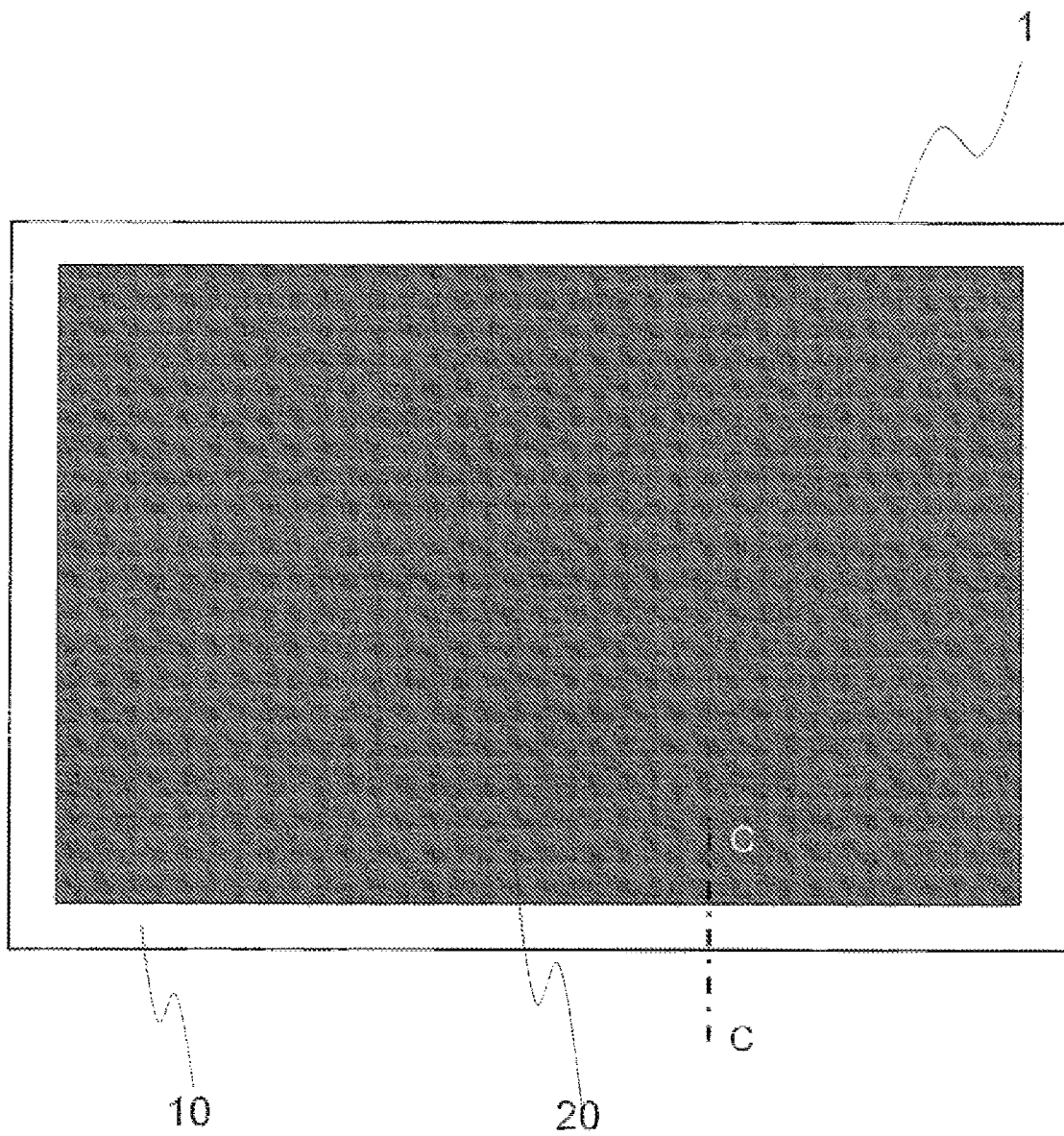
FIG. 7 is a front view schematically showing an image display apparatus according to a second embodiment.
Figure 8:
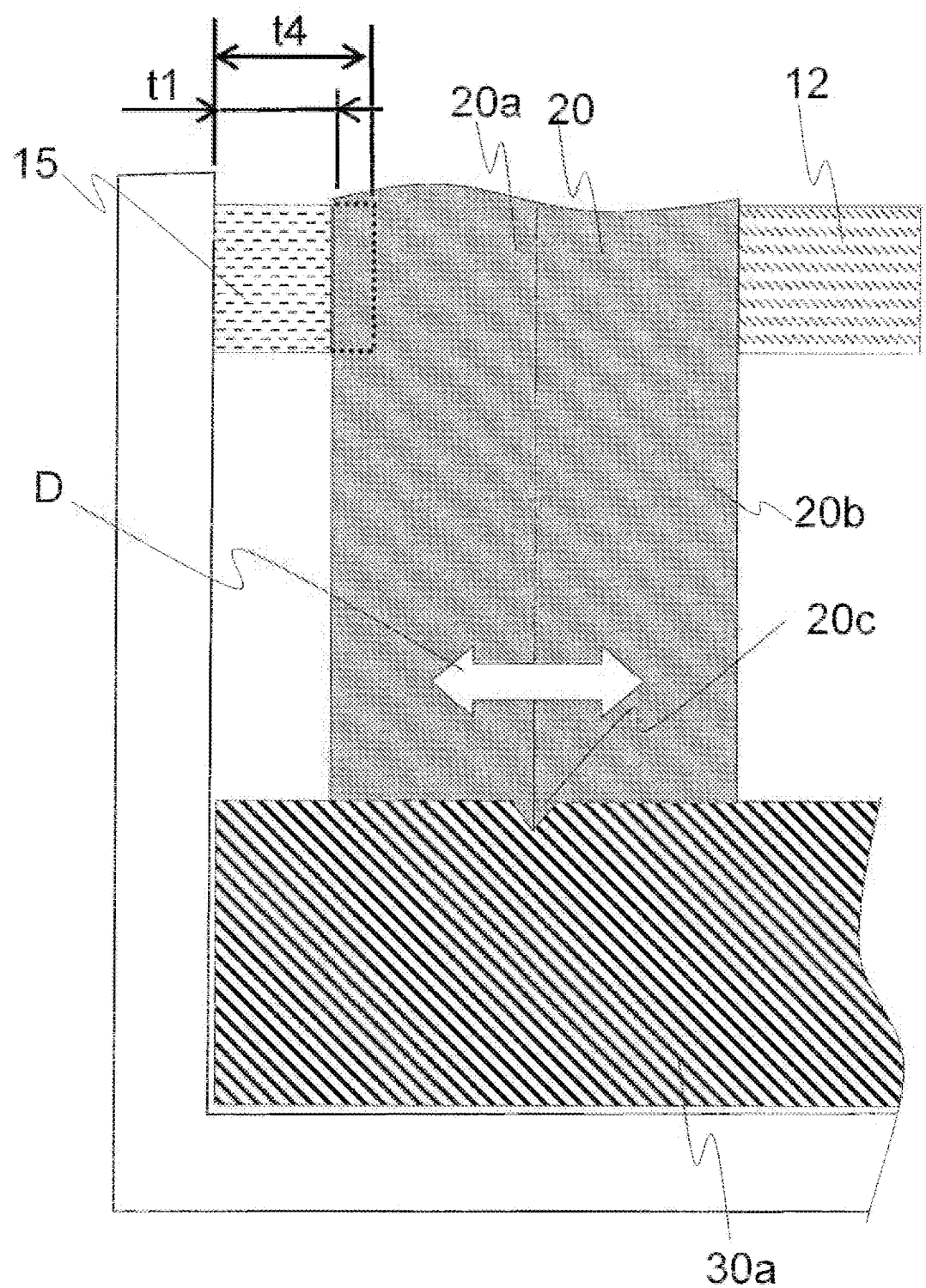
FIG. 8 is a cross-sectional view of the image display apparatus according to the second embodiment taken along line C-C in FIG. 7.

A second embodiment according to the present invention will be described. FIG. 7 is a front view schematically showing an image display apparatus according to the second embodiment. FIG. 8 is a cross-sectional view of the image display apparatus according to the second embodiment taken along line C-C in FIG. 7.

As shown in FIG. 7, a display panel 20 according to the second embodiment is pressed by a frame 10 from the front surface of the display panel 20 as is the case with Embodiment 1. As shown in FIG. 8, the display panel 20 is sandwiched and held between a front surface elastic body 15 and a rear surface elastic body 12. In this state, when the initial thickness of the front surface elastic body 15 for the lower side before assembly is denoted by t4, then as is the case with the Embodiment 1, the compression ratio C15 of the front surface elastic body 15 is calculated as follows.

$$C15=(t4-t1)/t4\times 100$$

The front surface elastic bodies for the three other sides are assumed to be formed of a material different from the material of the front surface elastic body 15 for the lower side and to have the same initial thickness as that of the front surface elastic body 15 for the lower side. That is, when reference numerals for dimensions shown in FIG. 5A are used, and the initial thickness t2 of the front surface elastic bodies for the three sides, that is, all the sides other than the lower side, is assumed to be equal to t4. According to Embodiment 1, the front surface elastic bodies for the four sides are formed of the same material, and the lower side is different from the three ether sides in initial thickness. However, according to the second embodiment, the front surface elastic bodies for the four sides have the same initial thickness, and the front surface elastic body for the lower side is different, in material, from the front surface elastic bodes for the three other sides. That is, according to the second embodiment, the front surface elastic bodies are formed of different materials (which are different in elastic property and elastic modulus) such that the front surface elastic bodies for the four sides are set to have the same compression ratio and that the compressive force on the lower side is higher than the compressive force on the three other sides.

Description will be given using a graph in FIG. 6. According to the second embodiment, the front surface elastic bodies for all of the four sides are set to have a compression ratio of 20%. A material A is set for a front surface elastic body 11. A material B is set for the front surface elastic body 15. In this case, the compressive force on the upper side, the right side, and the left side is $1.5\times 10^{-3}$ MPa. Furthermore, the compressive force on the lower side is $2.5\times 10^{-3}$ MPa. Hence, the compressive force on the lower side is set to be higher, suppressing the movement of the lower side of the display panel similarly to the first embodiment. This allows possible display unevenness and a variation of display unevenness to be suppressed as is the case with Embodiment 1.

Embodiment 3

A third embodiment according to the present invention will be described.

Figure 9A:
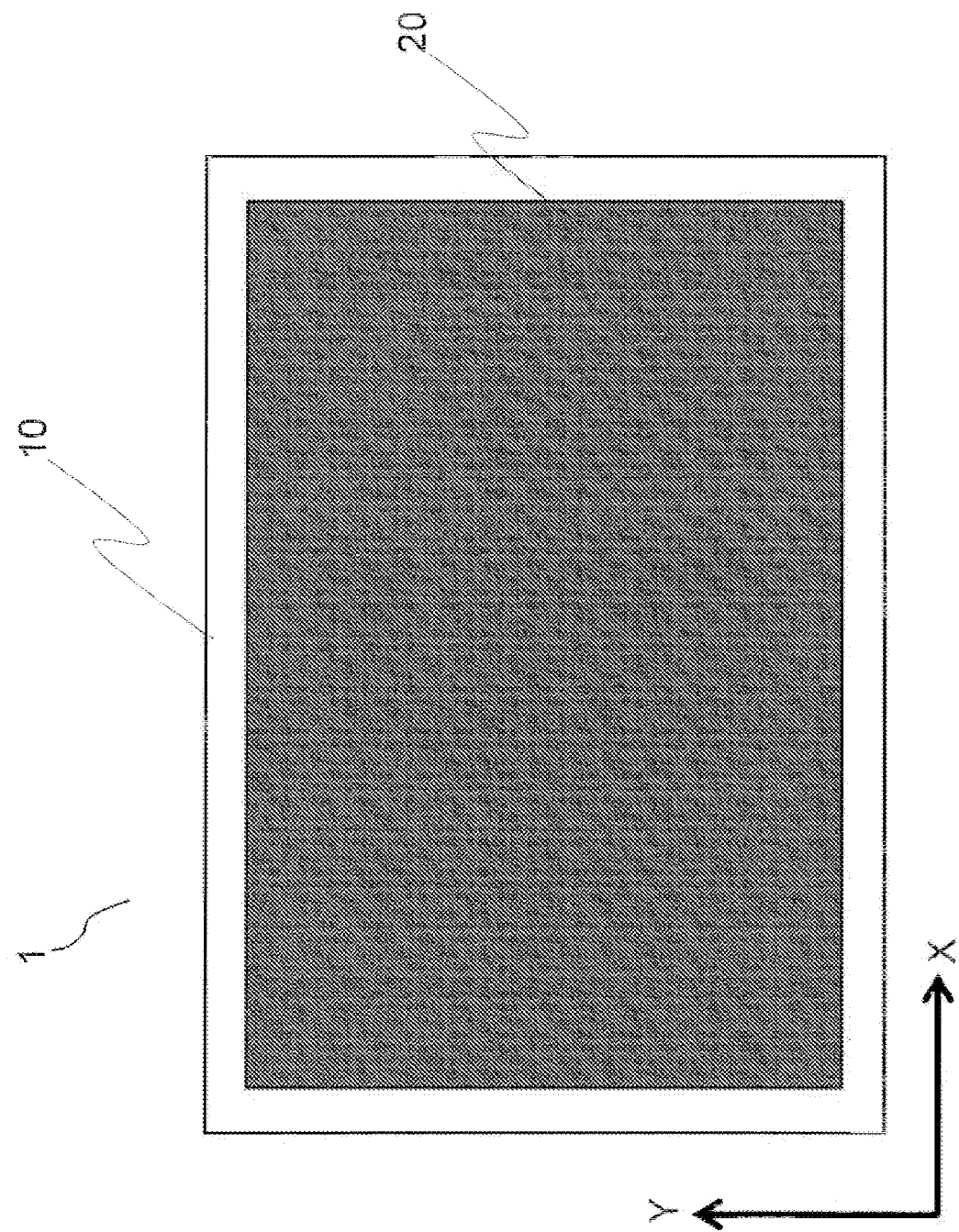
FIG. 9A and FIG. 9B are front views schematically showing an image display apparatus according to a third embodiment.
Figure 9B:
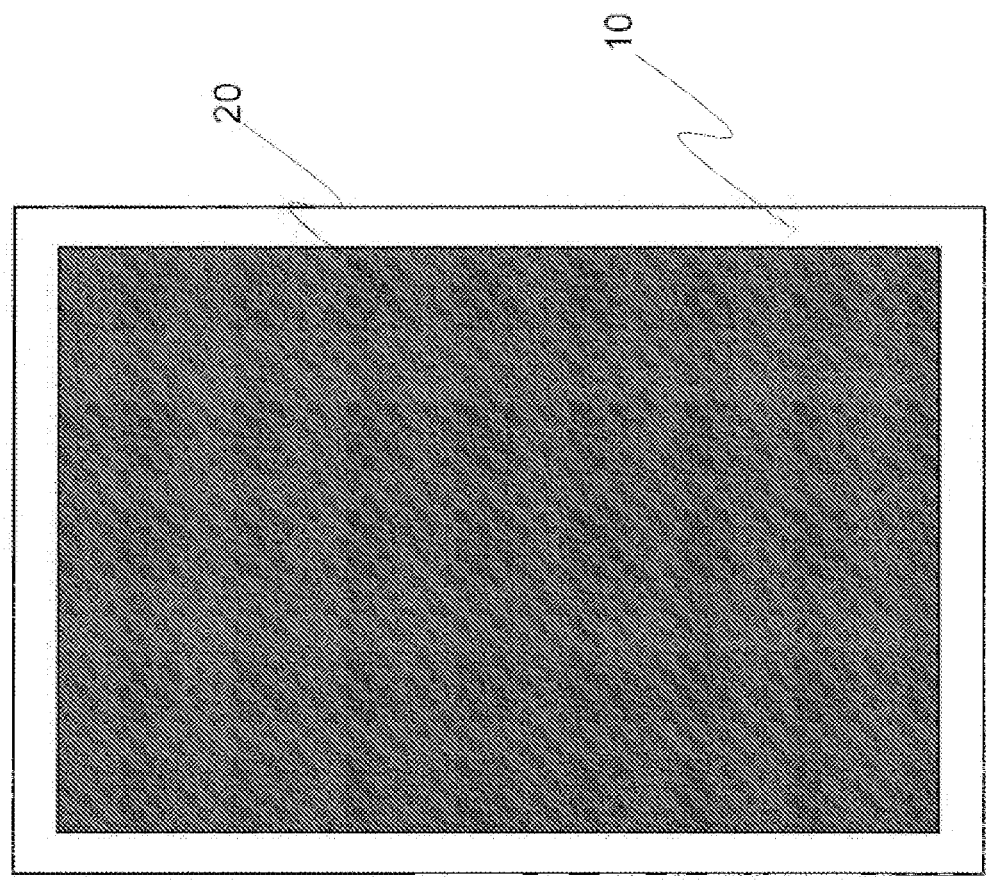
Figure 10:
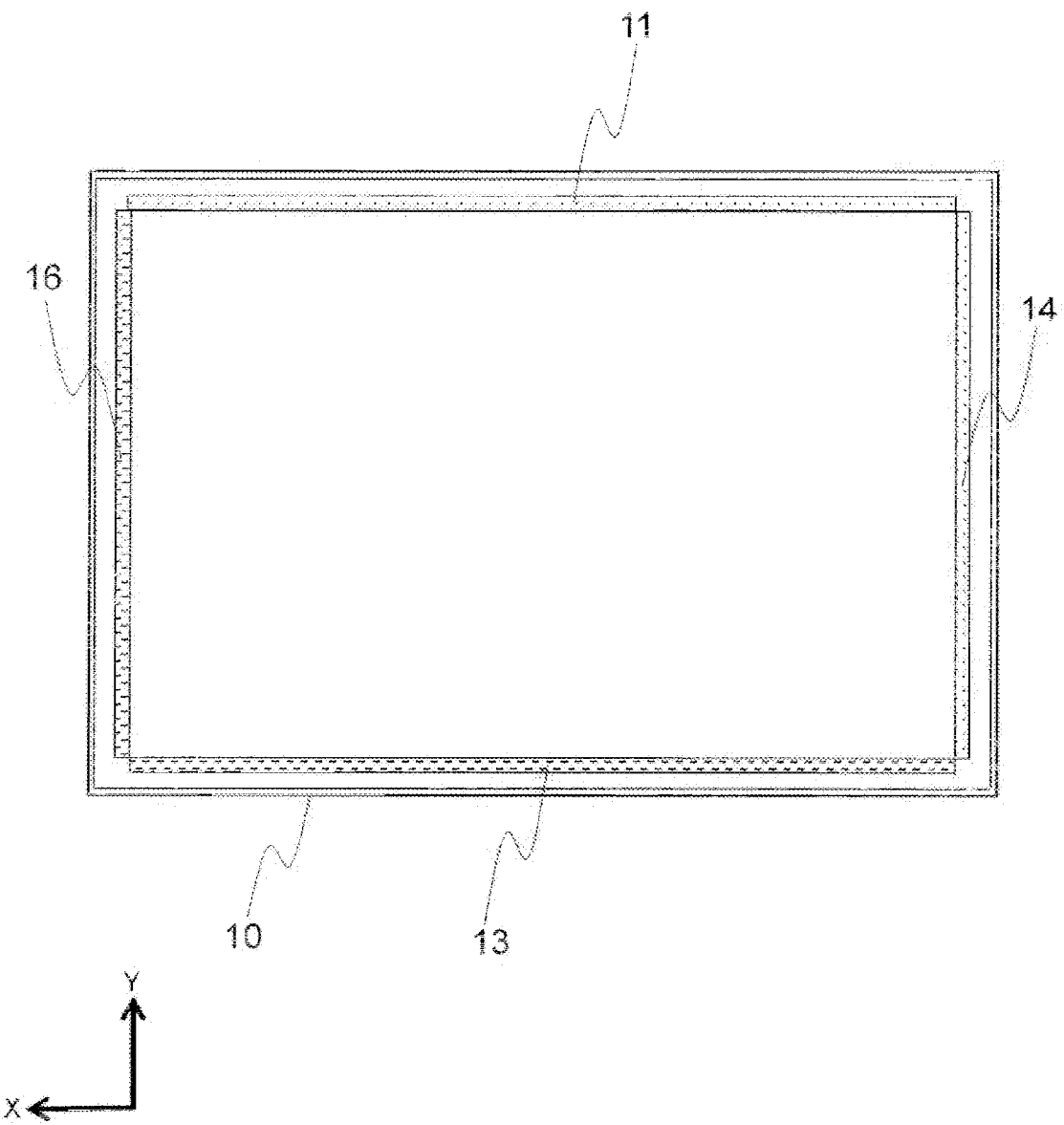
FIG. 10 is a diagram schematically showing arrangement of front surface elastic bodies with respect to a rear surface side of a frame according to the third embodiment.
Figure 11:
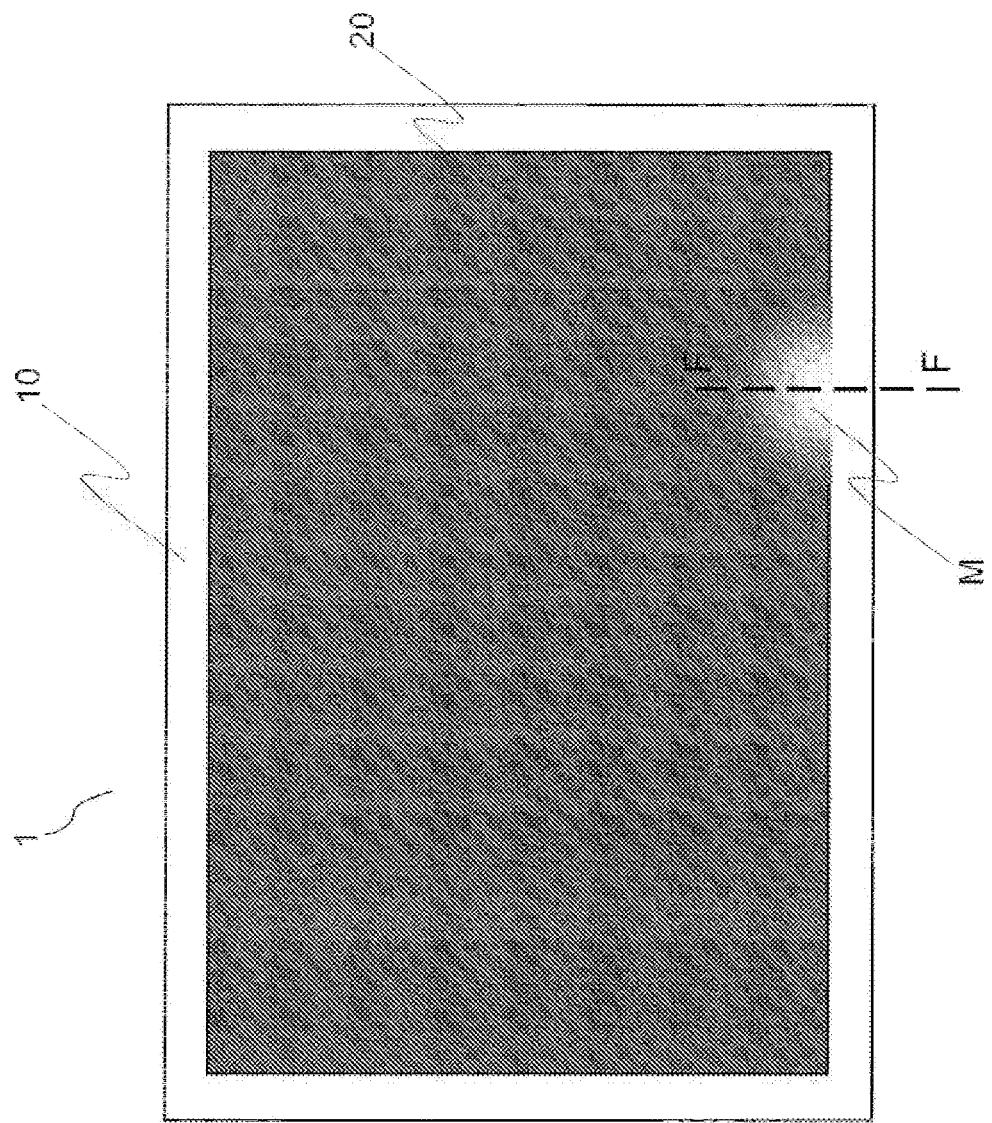
FIG. 11 is a diagram showing display unevenness in an image display apparatus.
Figure 12:
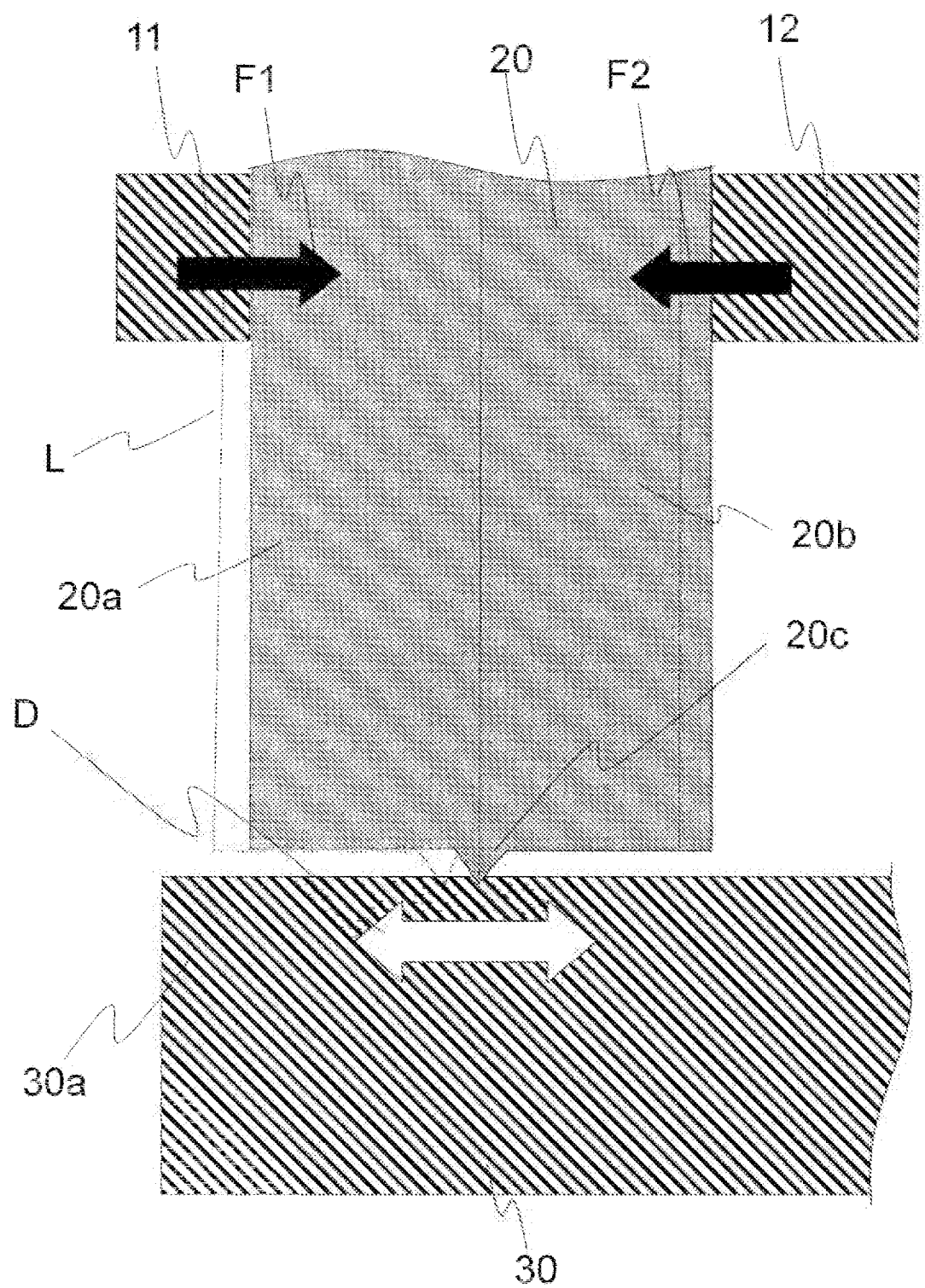
FIG. 12 is a cross-sectional view of an important part of a display panel showing an area where display unevenness occurs.

FIG. 9A and FIG. 9B are front views schematically showing an image display apparatus according to the third embodiment. Furthermore, FIG. 10 is a diagram schematically showing arrangement of front surface elastic bodies with respect to a rear surface side of a frame according to the third embodiment.

The image display apparatus according to the third embodiment is rotatable around an axis perpendicular to a screen. The image display apparatus can be used in one of a first state or a second state in which the image display apparatus has been rotated through 90 degrees from the first state. In FIG. 9A, an image display apparatus 1 is installed such that the longitudinal direction of the image display apparatus 1 corresponds to an X direction, whereas the short line direction corresponds to a Y direction and that the Y direction corresponds to the vertical direction (a −Y direction corresponds to the direction of gravitational force). In FIG. 9A, the image display apparatus 1 is used in a landscape (horizontal) orientation. On the other hand, for edition of still images, medical applications, and the like, the image display apparatus 1 may be used in a portrait (vertical) orientation. FIG. 9B shows a vertically long orientation of the image display apparatus 1, where the X direction corresponds to the vertical direction (a +X direction corresponds to the direction of gravitational force).

The arrangement of the front surface elastic bodies stuck to the rear surface of a frame of the image display apparatus will be described with reference to FIG. 10. As shown in FIG. 9, the gravitational force is expected to act on the image display apparatus in two directions, that is, a −Y direction and the +X direction. In other words, depending on whether the image display apparatus 1 is horizontally or vertically oriented, either one of front surface elastic bodies 13 and 16 serves as a front surface elastic body for the lower side of the display panel 20. Neither of front surface elastic bodies 11 and 14 serves as a front surface elastic body for the lower side of the display panel 20. Thus, the pressing force on the front surface elastic bodies 11 and 14 may be low. Thus, according to the third embodiment, the pressing force on the front surface elastic bodies 13 and 16 is set to be higher than the pressing force on the front surface elastic bodies 11 and 14 to the degree that possible display unevenness is prevented.

According to the third embodiment, regardless of whether the image display apparatus is horizontally or vertically oriented, a high pressing force is applied to the lower side of the front surface elastic body, which is subjected to the weight of the display panel. This enables movement of the display panel to be suppressed, allowing possible display unevenness to be inhibited.

The embodiments provide, by way of example, the front surface elastic bodies which are disposed between the display panel and the frame holding the display panel from the front surface thereof and which are configured as follows. The pressing force on the lower side is set higher than the pressing force on the other sides, the compression ratio of the front surface elastic body for the lower side is higher than the compression ratio of the front surface elastic bodies for the other sides, or the elastic modulus of the front surface elastic body for the lower side is higher than the elastic modulus of the front surface elastic bodies for the other sides. However, these characteristic configurations may be applied to the rear surface elastic bodies which are disposed between the display panel and the panel holder holding the display panel from the rear surface thereof and which serve as cushioning members.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-102222, filed on May 14; 2013, which is hereby incorporated by reference herein in its entirety.

What is claimed is:

1. An image display apparatus comprising:
   a display panel;
   a holding member holding four sides of the display panel; and
   cushioning members disposed between the display panel and the holding member such that a pressing force depending on an amount of deformation is applied to the display panel, wherein
   a pressing force acting on the display panel through the cushioning member for a lower side among the four sides of the display panel is higher than a pressing force acting on the display panel through at least one of the cushioning members for the other sides of the display panel.

2. The image display apparatus according to claim 1, wherein, when the image display apparatus is operative, a compression ratio of the cushioning member for the lower side is higher than a compression ratio of the at least one of the cushioning members for the other sides.

3. The image display apparatus according to claim 1, wherein a thickness of the uncompressed cushioning member for the lower side is larger than a thickness of the at least one of uncompressed cushioning members for the other sides.

4. The image display apparatus according to claim 3, wherein the cushioning member for the lower side and the at least one of the cushioning members for the other sides are elastic members having the same property.

5. The image display apparatus according to claim 1, wherein, when amounts of deformation of the cushioning members for the lower side and the at least one of the cushioning members of the other sides are equal to each other, the pressing force acting on the display panel through the cushioning member for the lower side is higher than the pressing force acting on the display panel through the at least one of the cushioning members for the other sides.

6. The image display apparatus according to claim 5, wherein the cushioning member for the lower side has a property different from a property of the at least one of the cushioning members for the other sides, and the cushioning member for the lower side has a larger elastic modulus than the at least one of the cushioning members for the other sides.

7. The image display apparatus according to claim 1, wherein a shape and a physical property of the cushioning member are determined such that, when a usage environment condition changes and as a result the display panel is warped, the pressing force acting on the display panel through the cushioning member becomes weaker than a pressing force that causes display unevenness in the display panel.

8. The image display apparatus according to claim 1, wherein the holding member is a frame that holds the display panel from front, and
   the cushioning members are front surface elastic bodies disposed between the display panel and the frame.

9. The image display apparatus according to claim 1, wherein the holding member is a panel holder that holds the display panel from a rear surface thereof, and
   the cushioning members are rear surface elastic bodies disposed between the display panel and the panel holder.

10. The image display apparatus according to claim 1, wherein the display panel is rotatable, the image display apparatus is used in one of a first state or a second state in which the image display apparatus has been rotated through 90 degrees from the first state, and the pressing force acting on the display panel through the lower side in the first state and through the lower side in the second state is higher than the pressing force acting on the display panel through the at least one of the cushioning members for the other sides.

11. The image display apparatus according to claim 1, wherein a pressing force acting on the display panel through the cushioning member for at least one of four sides of the display panel which corresponds to a lower side when the image display apparatus is operative is higher than a pressing force acting on the display panel through the at least one of the cushioning members for other sides of the display panel.

12. The image display apparatus according to claim 1, wherein the pressing force acting on the display panel through the cushioning member for the lower side of the display panel is higher than a pressing force acting on the display panel through each of the cushioning members for two of the other sides of the display panel,
   each of said two of the other side of the display panel is connected to the lower side of the display panel.

13. The image display apparatus according to claim 1, wherein the pressing force acting on the display panel through the cushioning member for the lower side is higher than a pressing force acting on the display panel through each of the cushioning members for all of the other sides of the display panel.

14. The image display apparatus according to claim 1, wherein the holding member holding four front sides of the display panel is a first holding member, and
   the cushioning members disposed between the display panel and the first holding member are first cushioning members, and
   the image display apparatus further comprises;
   a second holding member holding four rear sides of the display panel, and
   second cushioning members disposed between the display panel and the second holding member, wherein
   a second cushioning member disposed on the lower side of the display panel faces a first cushioning member disposed on the lower side of the display panel.

15. The image display apparatus according to claim 1, wherein the four sides of the display panel are four peripheral sides of the display panel.

16. The image display apparatus according to claim 1, wherein the cushioning member for the lower side and at least one of the cushioning members for the other sides are formed of a same material.

* * * * *